(12) United States Patent
Funk et al.

(10) Patent No.: US 6,374,816 B1
(45) Date of Patent: Apr. 23, 2002

(54) APPARATUS AND METHOD FOR COMBUSTION INITIATION

(75) Inventors: Werner Funk, Olivenhain; Travis L. Eiler, Santee, both of CA (US)

(73) Assignee: Omnitek Engineering Corporation, San Marcos, CA (US)

( * ) Notice: Subject to any disclaimer, the term of this patent is extended or adjusted under 35 U.S.C. 154(b) by 0 days.

(21) Appl. No.: 09/840,313

(22) Filed: Apr. 23, 2001

(51) Int. Cl.⁷ .................................................. F02P 1/00
(52) U.S. Cl. ............ 123/605; 123/143 C; 123/169 PH; 123/633; 123/634
(58) Field of Search .................................. 123/633, 634, 123/635, 605, 169 PH, 143 C

(56) References Cited

U.S. PATENT DOCUMENTS

| | | |
|---|---|---|
| 1,447,812 A | 3/1923 | Otto |
| 1,756,486 A | 4/1930 | Henry |
| 1,902,541 A | 3/1933 | Brown et al. |
| 2,129,472 A | 9/1938 | Lysholm et al. |
| 2,173,766 A | 9/1939 | Ramsey |
| 2,376,362 A | 5/1945 | Kasarjian |
| 2,378,893 A | 6/1945 | Berkey et al. |
| 2,392,171 A * | 1/1946 | Marsh .......................... 315/57 |
| 2,415,138 A | 2/1947 | Kasarjian |
| 2,467,534 A * | 4/1949 | Osterman .................... 315/57 |
| 2,640,174 A | 5/1953 | Short et al. |
| 2,904,723 A | 9/1959 | Altrogge et al. |
| 2,927,248 A | 3/1960 | Ramsay |
| 3,045,148 A | 7/1962 | McNulty |
| 3,324,347 A | 6/1967 | Brugnola |
| 3,336,506 A | 8/1967 | Frank |
| 3,361,932 A | 1/1968 | Campbell |
| 3,683,232 A | 8/1972 | Baur |
| 3,842,819 A | 10/1974 | Atkins et al. |
| 4,082,980 A | 4/1978 | Yoshikawa et al. |
| 4,122,816 A | 10/1978 | Fitzgerald et al. |
| 4,123,688 A | 10/1978 | Yoshikawa et al. |
| 4,223,656 A | 9/1980 | Hamley |
| 4,324,219 A | 4/1982 | Hayashi |
| 4,333,125 A | 6/1982 | Hensley et al. |
| 4,333,126 A | 6/1982 | Hensley et al. |
| 4,402,036 A | 8/1983 | Hensley et al. |
| 4,549,114 A | 10/1985 | Herden |
| 4,589,398 A * | 5/1986 | Pate et al. .................... 123/596 |
| 4,590,536 A | 5/1986 | Gerry |
| 4,613,789 A | 9/1986 | Herden et al. |
| 4,631,451 A | 12/1986 | Anderson et al. |
| 4,636,690 A | 1/1987 | Herden et al. |
| 4,658,185 A | 4/1987 | Albrecht et al. |
| 4,727,891 A | 3/1988 | Schmidt et al. |
| 4,746,834 A | 5/1988 | Bauerle et al. |
| 4,751,430 A | 6/1988 | Muller et al. |
| 5,272,415 A * | 12/1993 | Griswold et al. ............ 123/605 |
| 5,315,982 A * | 5/1994 | Ward et al. .................. 123/634 |
| 5,371,436 A * | 12/1994 | Griswold et al. ............ 123/605 |
| 6,123,062 A * | 9/2000 | Rapoport et al. ............ 123/605 |

* cited by examiner

Primary Examiner—Erick Solis
(74) Attorney, Agent, or Firm—Peter R. Martinez

(57) ABSTRACT

An apparatus for combustion initiation in an internal combustion engine is provided. A capacitive spark plug boot uses the engine cylinder head as an outer capacitor member. The capacitive spark plug boot contains the inner capacitor member and an insulator. The insulator surrounds the inner capacitor member, with an outer surface of the insulator sized to engage a cylinder head cavity surrounding the spark plug. The capacitor stores electrical energy received from a power source, and delivers it to the spark plug upon formation of a spark.

41 Claims, 8 Drawing Sheets

APPARATUS AND METHOD FOR COMBUSTION INITIATION

FIELD OF THE INVENTION

The present invention generally relates to combustion initiation of fuel-air mixtures. More particularly, the invention concerns an apparatus and method for combustion of fuel-air mixtures in internal combustion engines employing a coil-on-plug ignition system.

BACKGROUND OF THE INVENTION

The purpose of an ignition system is to initiate combustion of a flammable fuel-air mixture by igniting the mixture at precisely the right moment. In spark-ignition engines, this is achieved with an electrical spark. Specifically, an electrical ark is formed between a center electrode and a ground electrode of a spark plug. A voltage, or electrical potential difference builds between the spark plug electrodes until a spark arks from the center electrode to the ground electrode. An ignition wire, or spark plug cable delivers the electrical energy from a coil to a spark plug boot that attaches the spark plug cable to the spark plug.

Efforts to improve the durability and reliability of ignition systems have focused on eliminating the spark plug cable. Removing spark plug cables also allows the removal of heat shields and cable looms, with the attendant elimination of voltage leaks and engine misfires caused by faulty spark plug cables. However, with the elimination of spark plug cables, individual coils must be placed near each spark plug, hence the "coil-on-plug" or "coil-near-plug" ignition system. A typical coil-on-plug ignition system includes a coil mounted on top of, or adjacent to each spark plug. A spark plug boot carries the electrical current from the coil to the spark plug. Where the coil is mounted adjacent to the spark plug, a short cable is used to connect the coil to the spark plug boot. In contrast to single-coil systems, with one coil supplying electrical energy to all of the engine's spark plugs, a coil-on-plug system uses a single coil to supply the electrical energy to a single spark plug. This allows the elimination of spark plug cables and their problems, but coil-on-plug ignition systems have their own problems.

Each ignition coil must be compact enough to meet engine-bay packaging requirements, while also avoiding interference with other engine components. These small coils can have difficulty generating the energy necessary to produce a spark that can reliably combust the fuel-air mixture. Moreover, to keep costs at a minimum, these small coils are designed to generate only just enough electrical energy to initiate combustion in a new, perfectly tuned engine. As carbon deposits build up in the combustion chamber, and engine timing deteriorates, reliable combustion also declines.

Moreover, initiating combustion in modern-day spark ignition engines is becoming increasingly difficult. This is because new fuel-efficient engine designs use lean fuel-air mixtures that are difficult to ignite. Turbochargers and superchargers are also used to increase engine efficiency, but the increased combustion chamber pressures they generate further suppress combustion. In addition, the gap between the electrodes in the spark plugs continues to increase, which increases the amount of electrical energy necessary to create a spark.

SUMMARY OF THE INVENTION

The present invention alleviates to a great extent the disadvantages of conventional coil-on-plug ignition systems by providing a capacitor that stores electrical energy received from the coil and delivers it to the spark plug to produce a powerful spark, thereby increasing combustion efficiency and decreasing harmful environmental emissions.

In a preferred embodiment, a capacitor is formed by a center element, an insulator and a cylinder head. A spark plug boot includes the center element that is structured to carry electric current from a coil to the spark plug located at the bottom of a cylinder head cavity. An insulator surrounds the center element, with an outer surface of the insulator sized to engage a surface of the cylinder head cavity. The spark plug boot is configured so that the center element, insulator and cylinder head comprise a capacitor that stores an electrical energy received from the coil, and discharges it to form a powerful spark at the spark plug.

One aspect of the invention includes a method for optimizing a storage capacity of the capacitor formed by the spark plug boot and the cylinder head. The method comprises the steps of determining an available electric energy from a coil-on-plug ignition system communicating with the capacitor, selecting an optimum capacitance value for the ignition system by finding a maximum capacitance value and subtracting a safety margin, and adjusting a capacitance of the capacitor to approximate the optimum capacitance value. The maximum capacitance value is determined when the spark plug only sparks sporadically and the safety margin is determined when the spark plug sparks consistently.

In another aspect of the present invention, the spark plug boot comprises a center element structured to carry electric current from the coil to the spark plug, with the spark plug comprising a first electrical path to ground. An insulator surrounds the center element, with an outer surface of the insulator sized to engage the cylinder head. The center element, insulator and cylinder head comprise a capacitor, with the capacitor having a second electrical path to ground, so that the spark plug and the capacitor are electrically connected in parallel. This increases the efficiency of the capacitor thereby increasing the electrical energy delivered to the spark plug.

Another embodiment of the present invention optimizes spark duration by including a resistor in the spark plug boot. The resistor and capacitor formed by the spark plug boot and cylinder head are sized to deliver an optimum spark by determining an available electrical energy from the capacitor, and selecting an ideal resistance value based on the available energy, wherein the ideal resistance value creates an optimum duration spark, thereby maximizing combustion of the fuel-air mixture.

These and other features and advantages of the present invention will be appreciated from review of the following detailed description of the invention, along with the accompanying figures in which like reference numerals refer to like parts throughout.

It will be recognized that some or all of the Figures are schematic representations for purposes of illustration and do not necessarily depict the actual relative sizes or locations of the elements shown.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, "the present invention" refers to any one of the embodiments of the invention described herein.

The purpose of an ignition system is to produce a powerful enough spark to initiate combustion of a fuel-air mixture. Combustion efficiency can be improved by increasing the power of the spark. The present invention increases spark power and intensity by positioning a capacitor between an electrical power supply and the spark plug. An electrical charge delivered from the power supply is stored in the capacitor and then quickly released, greatly increasing the intensity and power of the spark. One embodiment of the capacitor consists of an inner element or inner capacitive member, a dielectric, and a cylinder head that acts as the outer capacitor member. By using the cylinder head as an outer capacitor member, an extremely compact capacitor can be designed and installed in the tight confines of modern-day cylinder heads that position the spark plug at the bottom of a narrow cylinder head cavity. In addition, a capacitor that uses the cylinder head as the outer capacitor member is inexpensive to produce, and can be configured to suit a wide variety of cylinder head designs. Moreover, by using the cylinder head as the outer capacitor member, the capacitor is connected in parallel with the spark plug, as opposed to being connected in series, thereby increasing the capacitor and ignition system efficiency.

Figure 1:
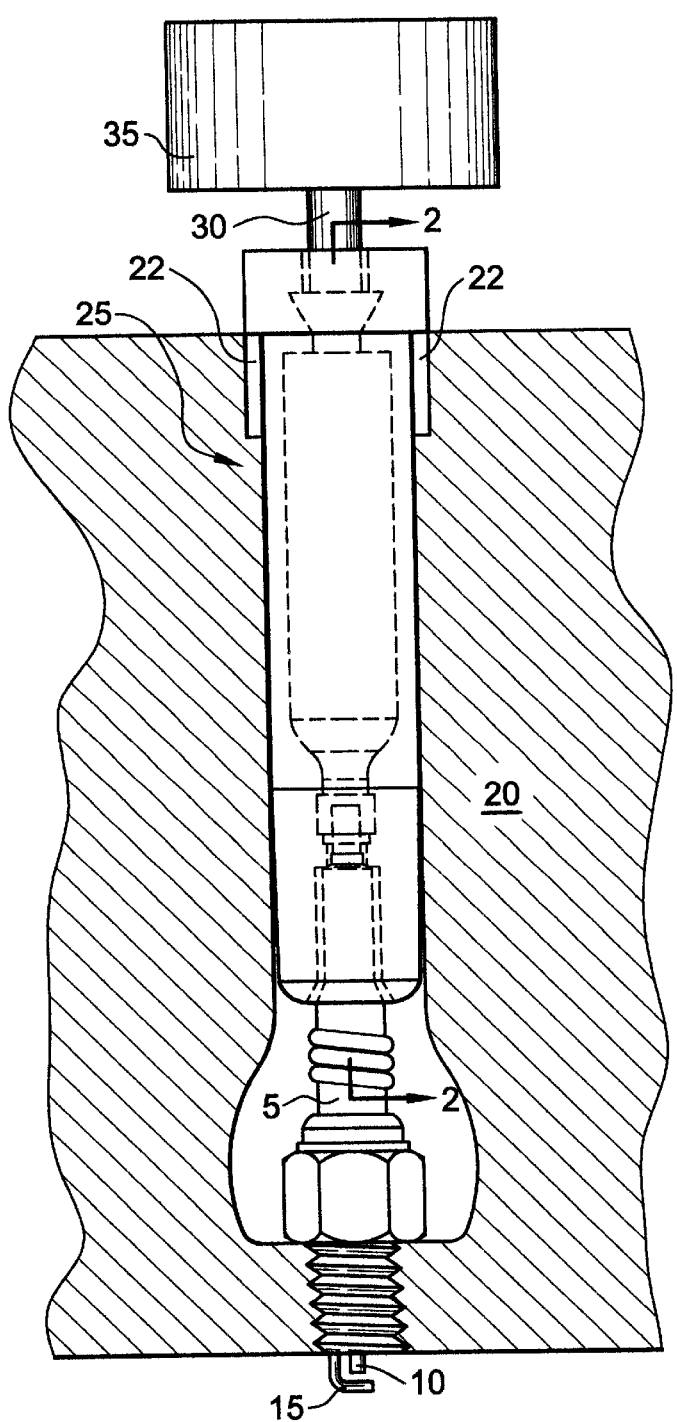
FIG. 1 is an elevation view of one embodiment of the present invention incorporated in a coil-on-plug ignition system.

Referring to FIG. 1, illustrating one embodiment of the present invention, a capacitive spark plug boot 25 operates like an inner member and insulator of a capacitor with the cylinder head 20 acting as the outer member of a capacitor. The capacitive spark plug boot 25 constructed and optimized according to one method of the present invention provides a way to improve fuel-air combustion. The capacitive spark plug boot 25 may be tuned to suit individual ignition systems to provide current to the spark plug 5 in a manner that creates an increased spark intensity, or power compared to conventional coil-on-plug ignition systems. As defined herein, a capacitive spark plug boot is any device that connects a spark plug to a power source. An ignition wire may be used with a capacitive spark plug boot to connect the boot to a power source. In addition, the present invention provides a method for optimizing spark duration, that is, the amount of time the spark lasts, by adjusting, or tuning the spark plug boot 25.

Figure 2:
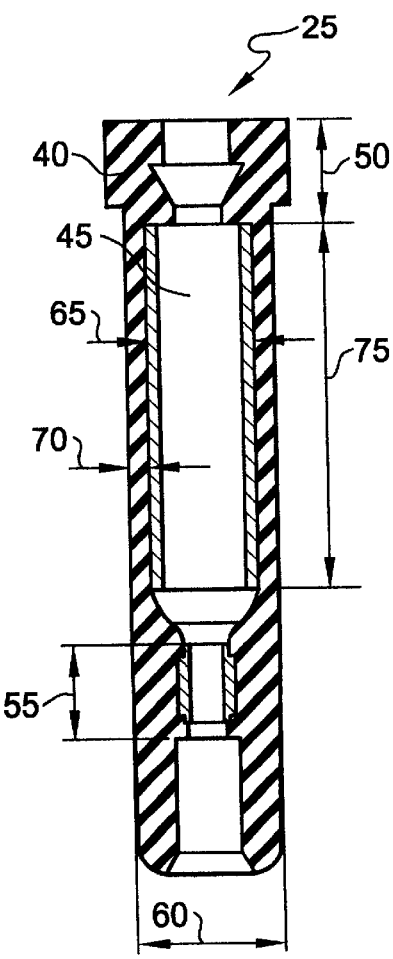
FIG. 2 is a sectional view of the embodiment of FIG. 1 taken along cutting plane 2—2.

As defined herein, a capacitor is a device that opposes any change in circuit voltage. In the present invention, a circuit is established between the power source, the spark plug boot 25, the spark plug 5 and an electrical ground. The outer, or ground electrode 15 of the spark plug 5 operates as one ground path, and the cylinder head 20 operates as a second ground path. Alternatively, the ground may be an engine block, vehicle component, or any other suitable electrical ground. Capacitors store electrical energy, and are generally constructed of two electrically conductive members, such as plates, that are isolated from one another by a dielectric material. In the present invention, one electrically conductive member is the inner capacitor member 45 and the second electrically conductive member is the cylinder head 20, which is illustrated in FIGS. 1 and 2. The dielectric member 40 insulates the inner capacitor member 45 from the cylinder head 20.

As shown in FIG. 1, a coil-on-plug or coil-near-plug ignition system arranged to include the present invention comprises, in part, a spark plug 5 mounted in a cylinder head 20, a capacitive spark plug boot 25 and a coil or electrical power source 35. The cylinder head 20 may include engine valve covers, and may also include one or more recesses or channels 22 formed in the cylinder head 20 to adjust the contact area between the dielectric member 40 and the cylinder head 20.

The present invention can also be incorporated into a conventional single-coil, or distributed ignition system where one coil sends electrical energy to a distributor that distributes the energy among a group of ignition wires. With a single-coil system, a capacitive spark plug boot 25 would be coupled to the end of each ignition wire, thereby electrically connecting the spark plug 5 to the ignition wire.

For example, the spark plug boot 25 couples the spark plug 5 to the coil, or power source 35. In a "coil-near-plug" system, a short ignition wire 30 may connect the power source 35 to the spark plug boot 25. Preferably, the power source 35 is a coil, but other devices, such as a magneto, that provide electrical energy can be used with the present invention. Preferably, the power source 35 is an ignition coil that amplifies 12 volts (V) received from a battery to approximately 20,000 V. Alternative batteries can supply 6, 24, 36 or 42 volts to the power source 35. Moreover, power source voltages can range from 5,000 V to 80,000 V, or more, depending upon the ignition system requirements.

Referring to FIG. 2, the spark plug boot 25 includes an inner capacitor member 45 surrounded by a dielectric member 40. The dielectric member 40 may be constructed of rubber, silicone or other suitable electrically insulating materials. One embodiment dielectric is a high-purity silicone dielectric known as SILCOSET (SILCOSET is a trademark of Imperial Chemical Industries, Ltd. of London, England), having a dielectric constant of about $20 \times 10^6$ volts per meter and a permittivity of about 3.4. If a different dielectric material is employed, having a different dielectric constant and permittivity, the thickness of the dielectric would have to be changed to maintain a similar electric insulation value. For example, the dielectric thickness 70 can vary from about 1 millimeter to about 10 millimeters, depending on the type of dielectric employed.

In one embodiment, the inner capacitor member 45 is located between an ignition cable terminal 50 and a spark plug terminal 55. The inner capacitor member 45 must be constructed of a conductive material. Any conductive material can be used to form the inner capacitor member 45, such as aluminum, steel, silver, copper or other suitable conductive materials. As illustrated in FIGS. 2–4, the inner capacitor 45 can assume several different shapes including, but not limited to a cylinder, helix, spiral and other shapes designed to suit individual ignition system requirements. Also, as illustrated in FIG. 4, the inner capacitor 45 can include holes 85, cavities, slots 90, channels, slits and other features that change the shape and surface area of inner capacitor 45. As discussed in detail below, the capacitance of a capacitor can be varied in several ways including: adjusting the inner capacitor member diameter 65, the inner capacitor member height 75, and the inner capacitor member thickness 80. One aspect of the present invention involves adjusting the components of the spark plug boot 25 so that the capacitor has a specific capacitance. This "tuning" of the capacitor ensures that an ideal capacitor is constructed for each individual ignition system.

Figures 3A, 3B:
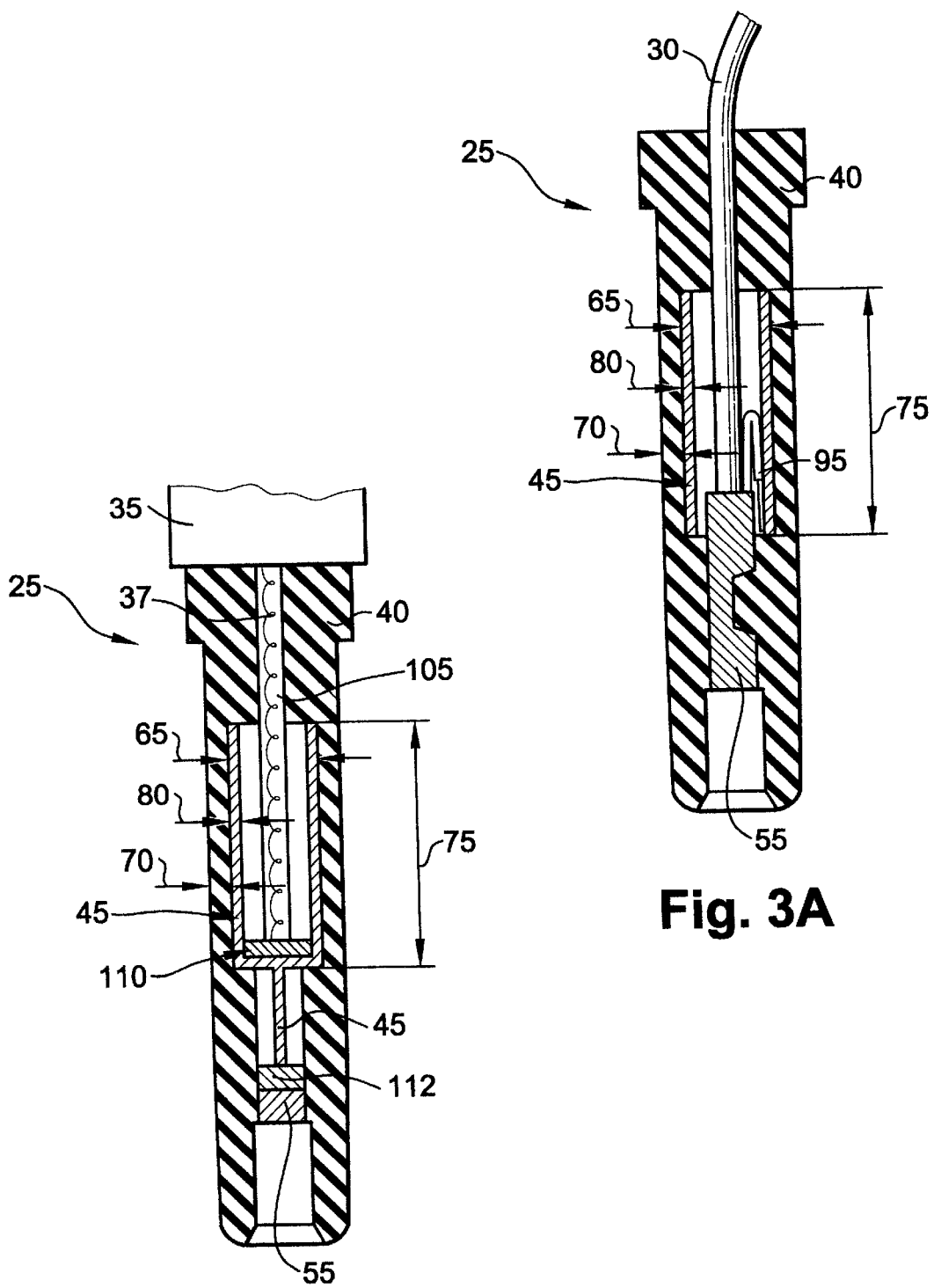
FIGS. 3A–3F illustrate sectional views of alternative embodiments of the present invention.

Referring to FIG. 3A an alternative embodiment capacitive spark plug boot 25 is illustrated. This capacitive spark plug boot 25 is structured to receive a standard ignition wire 30 that may be used in a coil-near-plug ignition system or in a "coil-pack" system. A connector 95 connects the ignition wire 30 to the inner capacitor member 45. A spark plug terminal 55 connects the ignition wire 30 to the spark plug 5. This embodiment uses a cylindrical sheet of copper as the inner capacitor member 45, but as discussed above other conductive materials can be employed.

Referring now to FIG. 3B, another embodiment capacitive spark plug boot 25 is illustrated. This capacitive spark plug boot 25 includes a coil connector 100 and a coil aperture 105 that receives a coil spring or other type of connector 37 from a coil-on-plug coil. The coil connector 37 may be a wire, spring or other device designed to transmit the voltage generated by the coil 35 to the inner capacitor member 45. Positioned between the coil aperture 105 and the inner capacitor member is a resistor 110. As discussed in detail below, the resistor 110 minimizes electromagnetic interference generated by the spark plug 5 spark. A spark duration resistor 112 may be positioned next to the spark plug terminal to adjust the duration of the spark plug 5 spark. The resistance of the resistor 110 can range between about 1000 ohms to about 3000 ohms. The resistance of the spark duration resistor 112 can range between about 50 ohms to about 1000 ohms.

Figure 3C:
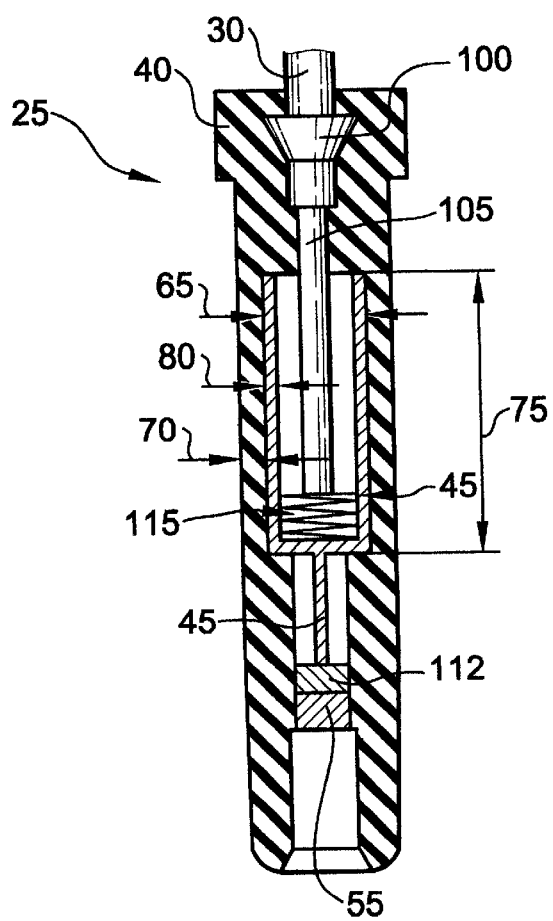

Illustrated in FIG. 3C, is yet another embodiment of a capacitive spark plug boot 25. This capacitive spark plug boot 25 includes a resistive inductor 115 that functions in a similar manner to the resistor 110 illustrated in FIG. 3B. A spark duration resistor 112 is located at the end of the inner capacitor member 45.

Figure 3D:
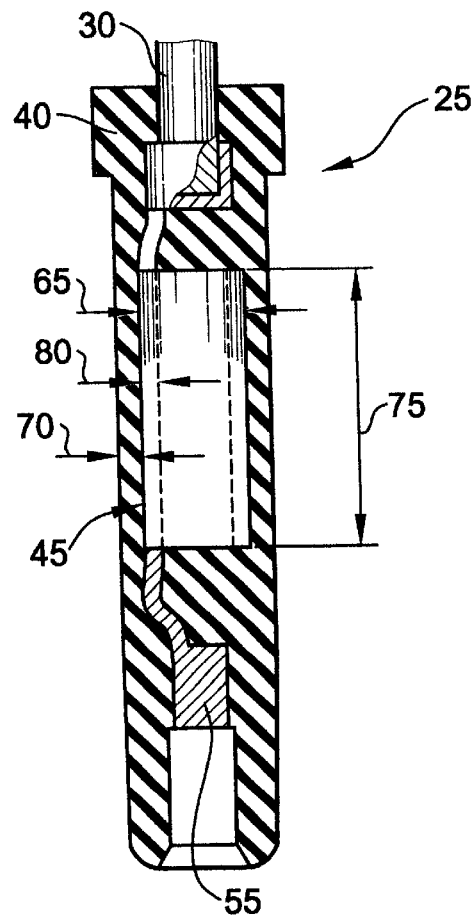
Figures 3E, 4:
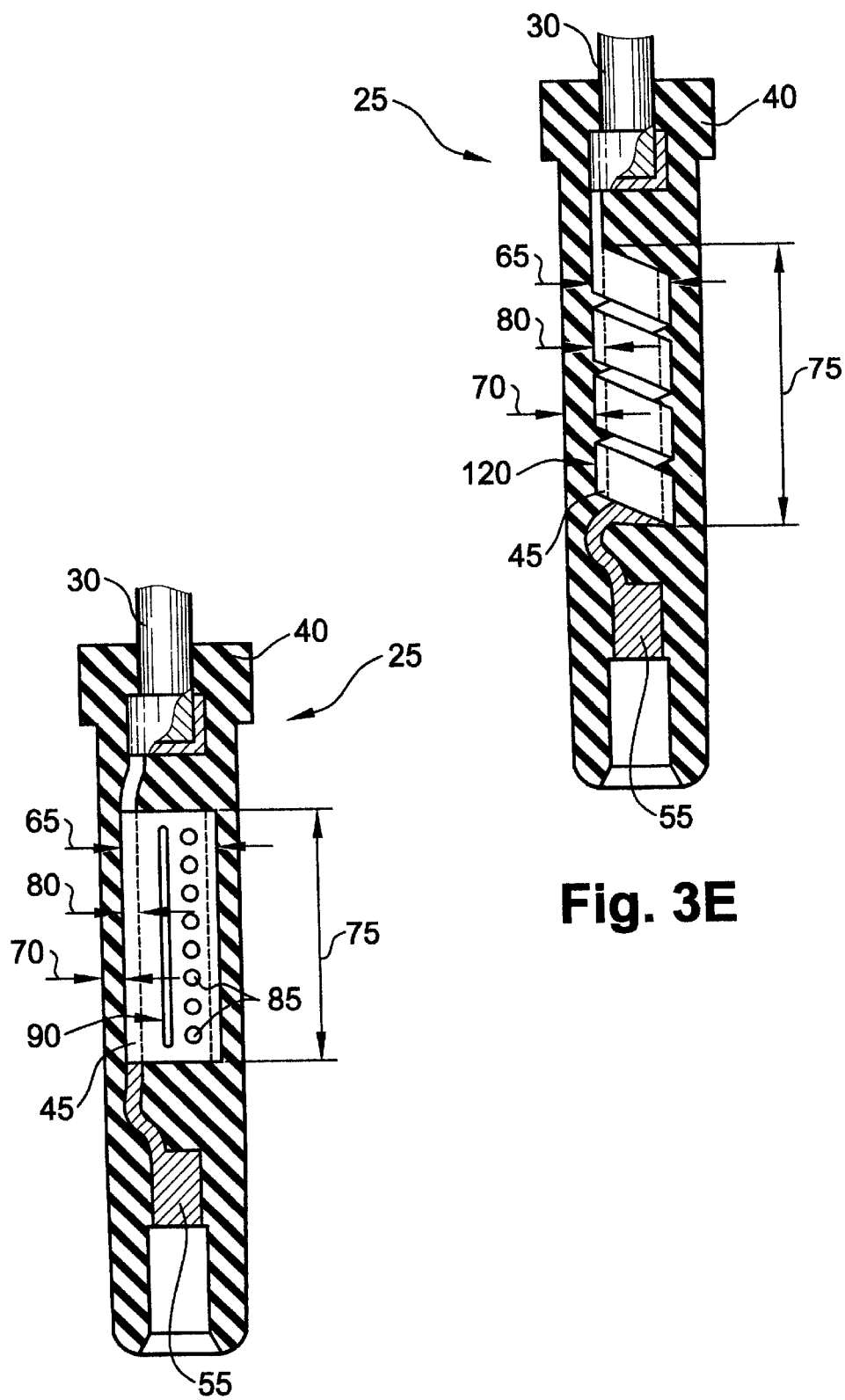
FIG. 4 is a sectional view of yet another embodiment of the present invention.

Referring to FIG. 3D a capacitive spark plug boot 25 structured to receive an ignition coil wire 30 is illustrated. Similar to the embodiment illustrated in FIG. 3A, this capacitive spark plug boot 25 is structured to receive an ignition wire 30 from a coil-near-plug, or distributive, ignition system. Similar to the embodiments illustrated in FIGS. 3A–3C, the inner capacitor member 45 is substantially cylindrical with a dielectric member 40 surrounding the inner capacitor member 45.

Figure 3F:
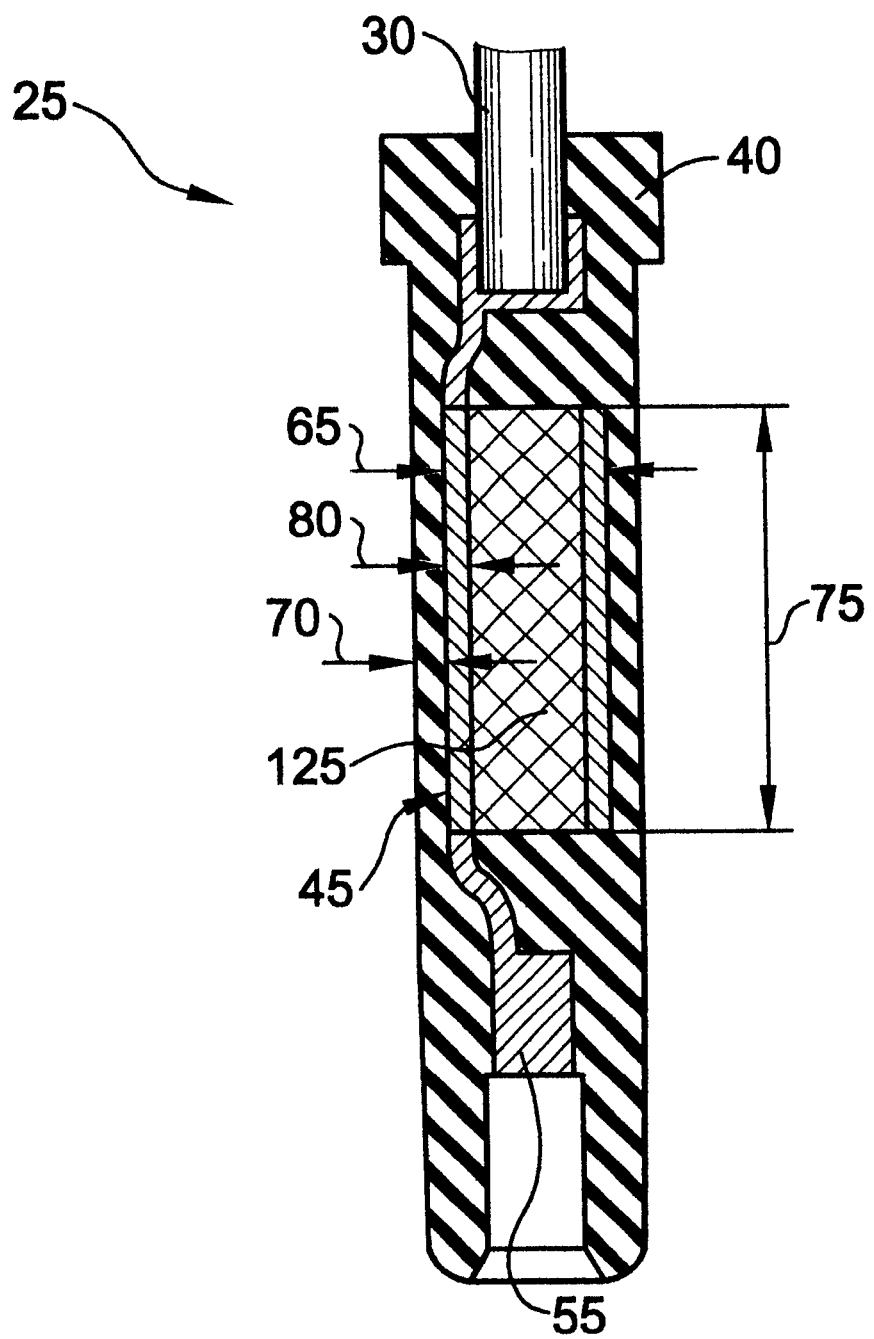

Referring to FIG. 3E, an alternative embodiment capacitive spark plug boot 25 is illustrated. The inner capacitor member 45 comprises a spiral, or helical wound structure 120. The helix is bendable and increases the overall flexibility of the spark plug boot 25. Illustrated in FIG. 3F, is an alternative embodiment capacitive spark plug boot 25 that incorporates a mesh-type structure 125 for the inner capacitor member 45. Similar to the embodiment of FIG. 3E, the mesh increases the flexibility of the spark plug boot 25. Alternatively, the inner capacitor member may be constructed of a conductive material in a foil-type form that is also flexible. Flexibility of the spark plug boot 25 can be advantageous in applications that require bending of the spark plug boot 25.

Figure 5:
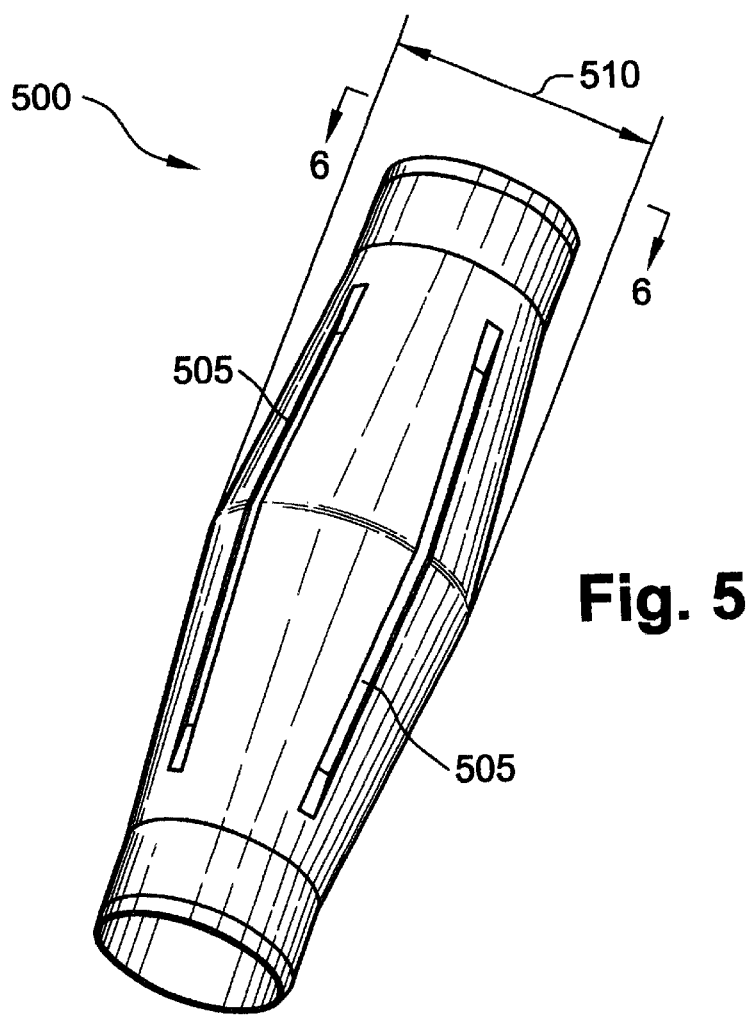
FIG. 5 is a perspective view of an outer member structured to encapsulate a portion of a spark plug boot constructing according to the present invention.
Figure 6:
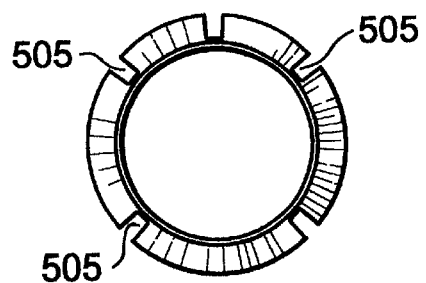
FIG. 6 is a sectional view taken along cutting plane 5—5 of FIG. 5.

Referring to FIG. 5, an outer member or sleeve 500 is illustrated. The sleeve 500 is sized to receive any one of the capacitive spark plug boots 25 described above. Specifically, the inner diameter of the sleeve 500 is sized to closely engage the outer surface of the dielectric member 40. Once the capacitive spark plug boot 25 is positioned within the sleeve 500, the sleeve is then inserted into the cylinder head 20. The outer surface of the sleeve 500 is structured to slidingly engage the cylinder head 20 establishing an electrical contact so that the cylinder head 20 can function as a second electrical ground path. Illustrated in FIGS. 5 and 6, a plurality of channels 505 are longitudinally positioned along the outer surface of the sleeve 500. The channels 505 permit the sleeve 500 to deflect as it is inserted into the cylinder head 20. The sleeve 500 has a maximum diameter 510 at the approximate midpoint of the sleeve 500. As the sleeve 500 is inserted into the cylinder head 20, the channels 505 will compress decreasing the diameter 510 of the sleeve, ensuring an interference fit with the cylinder head 20.

Figure 8:
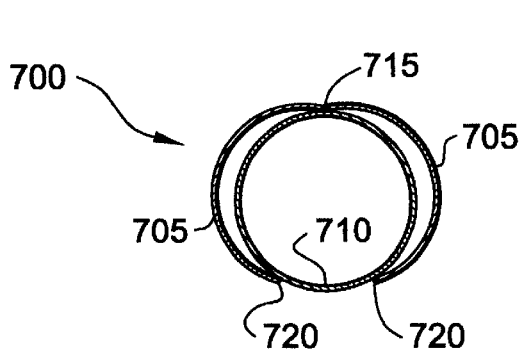
FIG. 8 is a sectional view taken along cutting plane 7—7 of FIG. 7.
Figure 7:
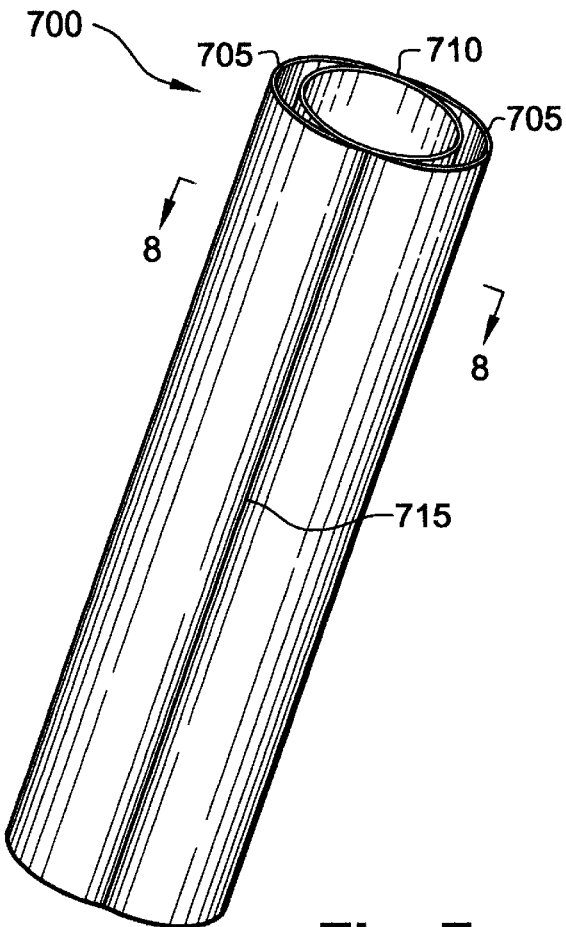
FIG. 7 is a perspective view of another embodiment of an encapsulation member structured to enclose a portion of a spark plug boot constructed according to the present invention.

Referring to FIG. 7, an alternative embodiment sleeve 700 is illustrated. Sleeve 700 includes two substantially half-cylindrical sections 705 that are deflectably mounted to a inner cylinder 710. As illustrated in FIGS. 7 and 8, the half-cylinder sections 705 each have a fixed edge 715 and a free edge 720. Each fixed edge 715 is connected to the inner cylinder 710. Illustrated in FIG. 8, the free edge 720 of each half-cylinder section 705 can slide along an outer surface of the inner cylinder 710. The outer surface of the half-cylinder sections 705 slidingly engage the cylinder head 20 and can deflect to adapt to different sized cylinder heads 20. As discussed above in connection with sleeve 500, the alternative sleeve 700 is configured to receive any one of the capacitive spark plug boots 25 described above.

Figure 9:
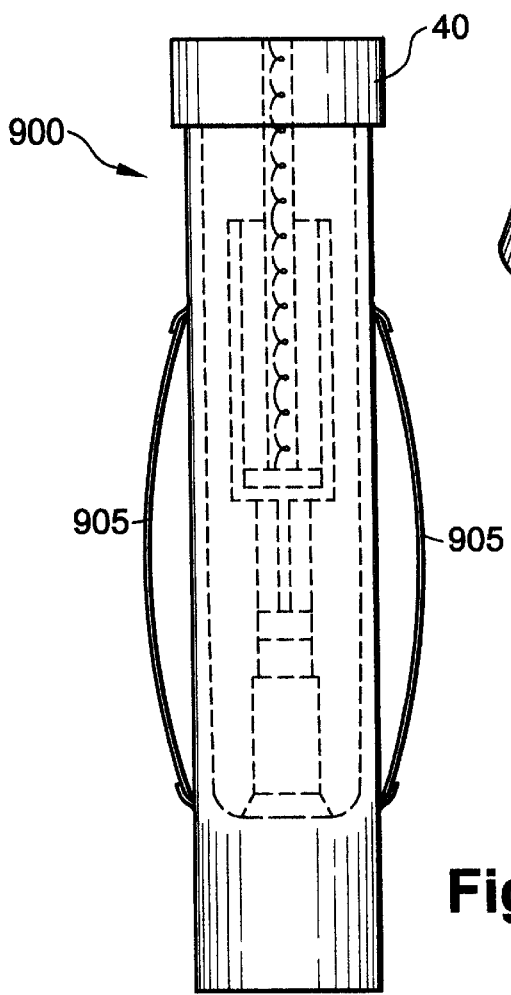
FIG. 9 is an elevation view of an alternative embodiment of an encapsulation member structured to enclose a portion of a spark plug boot constructed according to the present invention.

Referring to FIG. 9, another embodiment sleeve 900 is illustrated. The sleeve 900 is configured to receive a spark plug boot 25 and includes deflectable ribs 905 attached to an outer surface of the sleeve 900. The deflectable ribs 905 engage the cylinder head 20 when the sleeve 900 is inserted into the cylinder head 20. As discussed above in connection with the sleeve 500, alternative sleeve 900 is structured to receive a capacitive spark plug boot 25 and establish an electrical connection with the cylinder head 20. The present invention may incorporate individual features from any one of the herein disclosed embodiments.

In another aspect of the present invention, the capacitive spark plug boot 25 is electrically connected in parallel with the spark plug 5. Electrical devices can either be connected in parallel or in series. As shown in FIG. 1, the spark plug 5 is connected to an electrical ground through the ground electrode 15. The capacitive spark plug boot 25, employing the cylinder head 20 as an outer capacitor member, is connected to an electrical ground though the cylinder head 20. Therefore, the spark plug 5 and the capacitive spark plug boot 25 use different electrical paths to ground thereby connecting the components in parallel. In contrast, other capacitive devices are connected in series.

One theory of the operation of a capacitive spark plug boot 25 constructed according to the present invention is that when current is sent from the power source 35 to the inner capacitor member 45, the current is attracted to the electrical ground of the cylinder head 20. The cylinder head 20 and inner capacitor member 45 become capacitor electrodes separated by the dielectric member 40. The capacitor electrodes store the energy sent by the power source 35 until their capacity is reached. A final amount of energy sent by the power source 35 passes through the inner capacitor member 45 and generates sufficient voltage between spark plug electrodes 10 and 15 to create a spark. The capacitor then discharges, sending all of its stored energy to the spark plug 5 in a burst, creating a powerful spark.

The present invention consists of a surface-area-sizeable inner capacitor member 45 and a distance-sizeable dielectric member 40 that uses the cylinder head 20 as the outer capacitor member. In a preferred embodiment of the present invention, the capacitor is constructed to suit individual ignition systems. This is in contrast to conventional devices, that are constructed using a capacitive one-size-fits-all mentality. These devices either have too great, or too small a capacitance. For example, a device with high capacitance, but without sufficient resistance will deliver the stored capacitor energy in too short a time, creating a spark duration so short that ignition of the fuel-air mixture is erratic, or non-existent. Alternatively, when the capacitance of the device is too small, generally because the capacitor's size is limited by space constraints, there is no improvement in ignition of the fuel-air mixture.

A conventional coil-on-plug ignition system delivers the coil energy to the spark plug. However, the coil cannot deliver all required energy in a short burst, but instead requires time to discharge the energy. This creates a spark duration or time that is too long—between about two to four thousands of a second (0.002–0.004 sec). A long spark duration decreases spark power, because Power=Work/time. Therefore, by decreasing spark duration, spark power can be increased. Increased spark power improves the performance of modern-day engines that use lean fuel-air mixtures and have high combustion chamber temperatures and pressures.

A capacitive spark plug boot 25 configured according to the method of the present invention has a spark duration in the range of about 40 to 1000 nanoseconds. Therefore, spark power is significantly increased, and complete combustion, even under unfavorable conditions is assured. In addition, the capacitive spark plug boot 25 is carefully sized, or tuned to the power source 35 so that the capacitor is fully charged, yet sufficient energy is generated at the center electrode 10 to create a spark. Also, as illustrated in FIGS. 3B and 3C, a spark duration resistor 112 is optimized so that spark duration can be adjusted to initiate combustion. A capacitive spark plug boot 25 that performs as described above must be carefully tuned and constructed.

Figure 10:
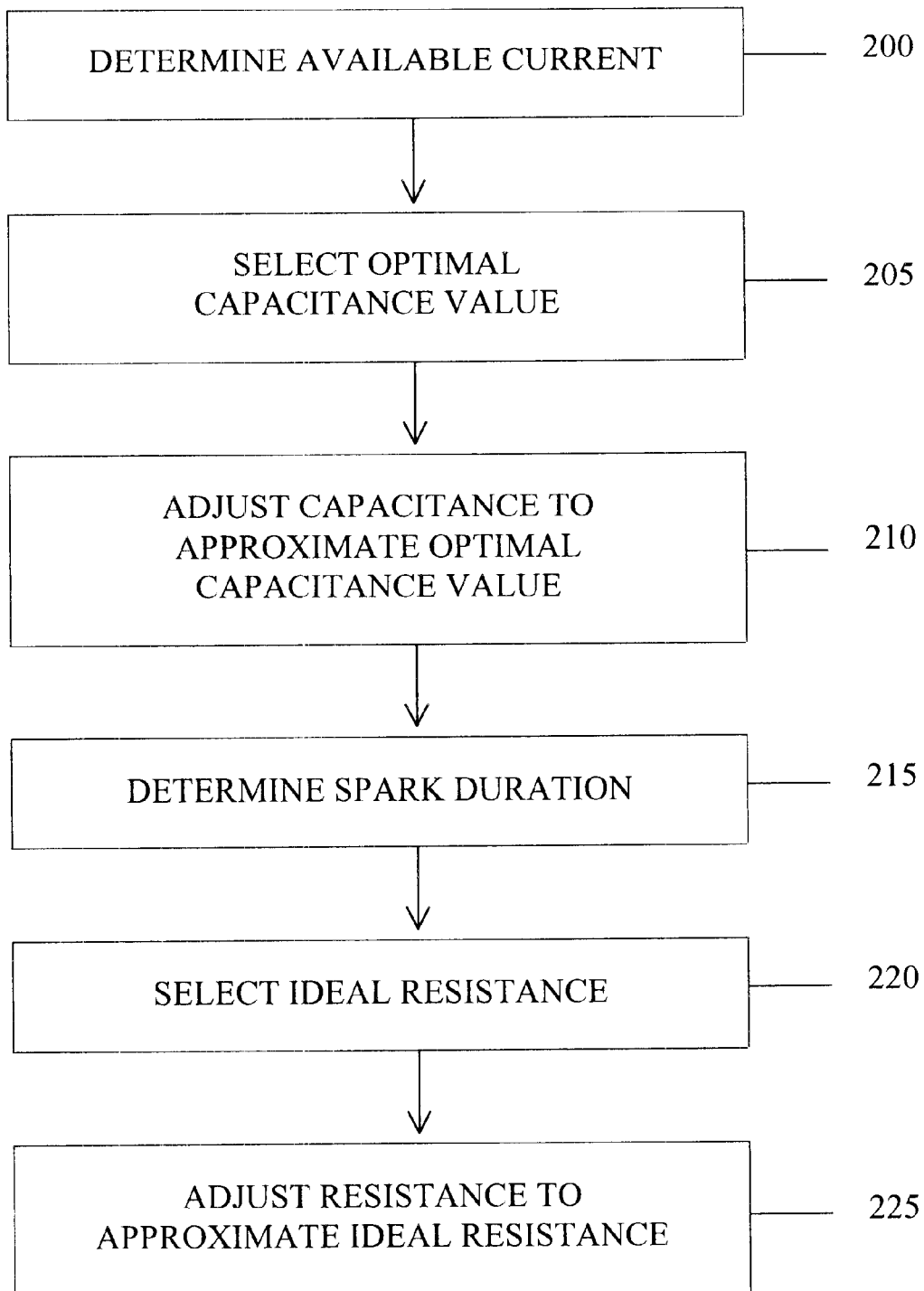
FIG. 10 is a flowchart illustrating one method for tuning a capacitor constructed according to the present invention.

FIG. 10 depicts a method for tuning a capacitive spark plug boot 25 having an optimal capacitance value. The method of the present invention can be used to construct a capacitive spark plug boot 25 that can be used on any device requiring spark ignition of a flammable fuel, such as 2-stroke engines, 4-stroke engines, Wankel engines, Miller-cycle engines and other fuel burning devices.

The first step 200 is to determine the available current. This is accomplished by inspecting the power source 35 to determine its output. A conventional power source 35 employs an ignition coil that amplifies 12 volts (V) received from a conventional battery to approximately 20,000 V. Alternative power sources 35 can supply 6, 24, 36 or 42 volts to the ignition coil. Moreover, voltages can range from 5,000 V to 80,000 V, or more, depending upon the coil characteristics.

The next step 205 is to select an optimal capacitance value. The capacitor must be sized so that it becomes fully charged, yet it must also allow passage of sufficient energy or current to create a spark at the spark plug. If the capacitance of the capacitor is too large, a spark will not form and combustion of the fuel-air mixture will not occur. Conversely, if the capacitance of the capacitor is too small, spark intensity will not increase enough to improve ignition of the fuel-air mixture. A capacitor having an optimal capacitance value is determined by finding a maximum capacitance value and subtracting a safety margin.

The capacitance value of the capacitive spark plug boot 25 may be increased as the voltage output of the coil increases. The optimal capacitance value for each ignition system is determined by finding the maximum capacitance value and subtracting a safety margin. The maximum capacitance value is the capacitance value of the capacitive spark plug boot 25 that causes intermittent, sporadic or no spark at the spark plug 5. In contrast, a consistent spark is a spark that occurs substantially every time at the spark plug 5.

To make certain that a spark is developed at the spark plug 5 under virtually all conditions, a small safety margin is subtracted from a maximum capacitance value to arrive at an optimal capacitance value. A capacitance decrease of about 10 to 15 picofarads has been found to be a sufficient safety margin. This allows for manufacturer variations, power source deterioration, transient ignition system conditions and other effects.

Once the small safety margin has been subtracted from the maximum capacitance value, the optimal capacitance value is found. For example, if the maximum capacitance value is 40 picofarads, a safety margin of about 10 picofarads would be subtracted leaving an optimal capacitance value of about 30 picofarads.

Therefore, the optimal capacitance value for a specific ignition system can be determined and a capacitive spark plug boot 25 can be constructed accordingly. The method of constructing a capacitive spark plug boot 25 according to the present invention allows for the optimum spark to be developed by tuning the capacitive spark plug boot 25 to suit the requirements of individual ignition systems.

As shown in FIG. 10, the next step 210 in tuning the capacitive spark plug boot 25 is to adjust the capacitance of the capacitor so that it matches the optimal capacitance value. Generally, there are three ways to adjust the capacitance of a capacitor: 1) the area of the inner capacitor member 45 and the outer capacitor member, in this case the cylinder head 20, can be changed; 2) the distance between the inner capacitor member 45 and the cylinder head 20 can be changed; and 3) the material used for the dielectric member 40 can be changed. If necessary, the cylinder head 20 may be modified to include a recess or slot 22 to change the surface area that contacts the dielectric member 40, as shown in FIG. 1.

Referring to FIG. 4, a capacitive spark plug boot 25 is illustrated and depicts several methods used to change the area of the inner capacitor member 45. Because the area of the outer capacitor member, which is the cylinder head 20, cannot be changed easily, a capacitance formula has been developed to determine capacitance based on the area of the inner capacitor member 45 and the thickness of the dielectric member 40. The capacitance of the capacitive spark plug boot 25 can be determined by the following capacitance formula (1):

$$C = \frac{\varepsilon A_P}{T_D} \quad (1)$$

where C is the capacitance of the capacitive spark plug boot 25, ∈ is the permittivity constant of 37.0×10–12 farads per meter, Ap is the area of the inner capacitor member 45, and $T_D$ is the dielectric member thickness 70. A preferred embodiment capacitive spark plug boot 25 may employ a substantially cylindrical inner capacitor member 45 and therefore the area Ap of the inner capacitor member 45 is determined by the following equation (2):

$$AP = \pi D c L c \quad (2)$$

where $D_c$ is the inner capacitor member diameter 65, and $L_c$ is the inner capacitor member length 75, illustrated in FIG. 4. Therefore, the capacitance of the capacitive spark plug boot 25 illustrated in FIG. 4 is equal to the following equation (3):

$$C = \frac{\varepsilon \pi D c L c}{T_D} \quad (3)$$

By changing the dimensions or values of each of the equation elements, the capacitance of the capacitive spark plug boot 25 can be optimized to suit specific ignition systems. Illustrated in FIG. 4, the area of the inner capacitor member 45 can be adjusted to suit specific ignition system requirements by also including one or more holes 85 or slots 90 in the inner capacitor member 45. By removing material from the inner capacitor member 45, the area of the inner capacitor member 45 is decreased, lowering the capacitance of the capacitive spark plug boot 25. As shown in FIGS. 3A–E, the inner capacitor member 45 can be constructed in a number of different ways to arrive at an optimal area Ap that creates an optimum capacitance.

As discussed above, another method of sizing, or tuning the capacitor is to increase or decrease the distance between the inner capacitor member 45 and the cylinder head 20. This is accomplished by changing the dielectric member thickness 70. The distance between capacitor elements of a capacitor effects the charge that is stored on each element. Capacitance increases when the capacitor elements are brought together. The thinner the dielectric, the closer the plates will be. A thin dielectric can thus increase capacitance. The dielectric member thickness 70 can vary from about 1 millimeter to over 10 millimeters, depending upon the requirements of individual ignition systems. The material used in a preferred embodiment dielectric member has an dielectric constant of about 15.8×106 volts per meter. If a dielectric having a different dielectric constant is used, the dielectric member thickness 70 would change to maintain the same electrical insulation value.

As shown in FIG. 10, once the capacitor has been optimally sized, the next step 215 in tuning the capacitive spark plug boot 25 is to determine the ideal spark duration, or time. A long spark duration decreases spark power, because Power=Work/time (or, electrically, Power=current×voltage). Current=charge/time, or put differently, current is the rate of flow of charge. Therefore, it follows that if the same amount of charge is delivered in less time, that is, if spark duration is decreased, spark power will be increased. A capacitive spark plug boot 25 constructed according to the present invention receives the same amount of electrical energy from the power source 35 as a conventional spark plug cable. However, since the present invention greatly reduces the spark duration, the spark power is proportionally increased. This greatly increases the spark intensity, creating a hotter spark thereby producing more efficient combustion.

Conventional ignition systems have a spark duration that is too long—between about two to four thousands of a second (0.002–0.004 sec). A capacitive spark plug boot 25 configured according to one method of the present invention has a spark duration in the range of 40 to 1000 nanoseconds depending on the ignition system and combustion chamber characteristics.

Referring again to FIG. 10, once the correct spark duration is determined, the next step 220 in tuning the capacitive spark plug boot 25 is to select an ideal resistance. One unique aspect of one method of the present invention is to optimize, or tune the spark duration by adjusting the resistance of spark duration resistor 112. Greater resistance increases spark duration and conversely, less resistance decreases spark duration. A preferred embodiment capacitive spark plug boot 25 will have a spark duration of about 300 nanoseconds. However, depending upon the design of the ignition system, and the requirements of the engine, spark duration may range from about 40 to about 1000 nanoseconds. The ideal resistance is selected by determining the capacitance of the capacitor, determining the capacitor's discharge characteristics, and determining the resistance between the capacitor and the spark plug 5, as all of these factors affect spark duration.

Shown in FIG. 10, the next step 225 is to adjust the resistance of capacitive spark plug boot 25 to approximate the ideal resistance. This is accomplished by selecting or constructing a spark duration resistor 112 that has an appropriate resistance. The resistance of the spark duration resistor 112 may range between about 50 ohms to about 1000 ohms. An alternative method is to increase the length of the inner capacitor member 45, thereby increasing the resistance of the capacitive spark plug boot 25.

Another advantage of the capacitive spark plug boot 25 is that electromagnetic interference (EMI) generated by the electrical energy sent to the spark plug 5 is minimized by employing the resistor 110 or the resistive inductor 115. The EMI can be in the form of unwanted high-frequency electrical signals also known as radio-frequency interference (RFI). Modem engine electronics, such as computer controlled, OBD II equipped engine management systems are extremely sensitive to EMI. Some ignition systems employing high-voltage power sources 35 can produce excessive, and damaging, amounts of EMI.

Thus, it is seen that an apparatus and method for combustion initiation, such as a capacitive spark plug boot, is provided. One skilled in the art will appreciate that the present invention can be practiced by other than the preferred embodiments, which are presented in this description for purposes of illustration and not of limitation, and the present invention is limited only by the claims that follow. It is noted that various equivalents for the particular embodiments discussed in this description may practice the invention as well.

What is claimed is:

1. A capacitor for an ignition system comprising an electrical current source and a spark plug mounted in a cylinder head, the capacitor comprising:

a center element structured to carry electric current from the electrical current source to the spark plug; and an insulator surrounding the center element, an outer surface of the insulator sized to engage the cylinder head;

wherein the center element, the insulator and the cylinder head comprise a capacitor.

2. The capacitor of claim 1, further including a outer member positioned about the insulator, the outer member structured to slidably engage the cylinder head.

3. The capacitor of claim 2, wherein the outer member comprises a cylinder with an inner surface engaging the insulator, and a deflectable rib attached to an outer surface of the cylinder, the deflectable rib structured to slidably engage the cylinder head.

4. The capacitor of claim 2, wherein the outer member comprises a cylinder including two substantially half-cylinder sections, each section having two edges, with one section edge attached to the cylinder so that the half-cylinder sections are deflectably attached to the cylinder and can thereby deflectably engage the cylinder head.

5. The capacitor of claim 2, wherein the outer member comprises a cylinder including two substantially half-cylinder members attached to the cylinder, the half-cylinder members having a maximum diameter near a middle of the cylinder, with the diameter decreasing toward each end of the cylinder, the half-cylinder members including a longitudinal slot so that the half-cylinder members can deflectably engage the cylinder head.

6. The capacitor of claim 2, wherein the outer member is comprised of a material selected from the group consisting of: conductive materials; ferromagnetic materials; copper; tin; brass and steel; and a combination of any one of copper, tin, brass and steel.

7. The capacitor of claim 1, wherein the center element comprises a first capacitor member, and a capacitance of the capacitor is adjusted by selectively increasing and decreasing a surface area of the center element.

8. The capacitor of claim 1, wherein a capacitance of the capacitor is adjusted by selectively increasing and decreasing a distance from the center element to a cylinder head surface.

9. The capacitor of claim 1, wherein the center element includes features selected from the group consisting of: holes, slots, cavities, voids, dimples, and indentations.

10. The capacitor of claim 1, wherein the center element comprises a first capacitor member selected from the group consisting of: a rolled strip, a helix-wound strip, a foil, a wire mesh, a spring, a stamped element, a cast element and a machined element.

11. The capacitor of claim 1, further including an ignition cable connector arranged to electrically connect the electrical current source to the center element, and a spark plug connector arranged to electrically connect the center element to the spark plug.

12. The capacitor of claim 1, further including a spark duration adjusting element communicating with the center element, the spark duration adjusting element comprising a resistor.

13. The capacitor of claim 1, further including an electromagnetic interference suppressing element communicating with the center element, the electromagnetic interference suppressing element selected from the group consisting of resistors and resistive inductors.

14. The capacitor of claim 1, wherein the center element and insulator are sized and configured to produce an optimum capacitance value, the optimum capacitance value determined by finding a maximum capacitance value and subtracting a safety margin;

wherein the maximum capacitance value is determined when the spark plug sparks sporadically and the safety margin is determined when the spark plug sparks consistently.

15. The capacitor of claim 14, wherein the optimum capacitance value can range from about 10 picofarads to about 200 picofarads.

16. The capacitor of claim 1, wherein the cylinder head includes valve covers.

17. A spark plug boot for a coil-on-plug ignition system comprising an electrical current source and a spark plug mounted in a cylinder head, the spark plug boot comprising:

a center element structured to carry electric current from the electrical current source to the spark plug, the spark plug comprising a first electrical path to ground; and an insulator surrounding the center element, an outer surface of the insulator sized to engage the cylinder head;

wherein the center element, the insulator and the cylinder head comprise a capacitor, the capacitor having a second electrical path to ground, so that the spark plug and the capacitor are electrically connected in parallel.

18. The spark plug boot of claim 17, wherein the cylinder head comprises a cylinder head cavity, with the outer surface of the insulator sized to engage the cylinder head cavity, and the second electrical path to ground for the capacitor is a surface of the cylinder head cavity.

19. The spark plug boot of claim 17, further including a outer member positioned about the spark plug boot, the outer member structured to slidably engage the cylinder head thereby providing the second electrical path to ground.

20. The spark plug boot of claim 19, wherein the outer member is selected from a group consisting of:

a cylinder with an inner surface engaging the spark plug boot, and a deflectable rib attached to an outer surface of the cylinder, the deflectable rib structured to slidably engage the cylinder head;

a cylinder including two substantially half-cylinder sections, each section having two edges, with one section edge attached to the cylinder so that the half-cylinder sections are deflectably attached to the cylinder and can thereby deflectably engage the cylinder head; and a cylinder including two substantially half-cylinder members attached to the cylinder, the half-cylinder members having a maximum diameter near a middle of the cylinder, with the diameter decreasing toward each end of the cylinder, the half-cylinder members including a longitudinal slot so that the half-cylinder members can deflectably engage the cylinder head.

21. The spark plug boot of claim 17, wherein the center element comprises a first capacitor member, and a capacitance of the capacitor is adjusted by selectively increasing and decreasing a surface area of the center element.

22. The spark plug boot of claim 17, wherein the center element includes features selected from the group consisting of: holes, slots, cavities, voids, dimples and indentations.

23. The spark plug boot of claim 17, wherein the center element comprises a first capacitor member selected from the group consisting of: a rolled strip, a helix-wound strip, a foil, a wire mesh, a spring, a stamped element, a cast element, and a machined element.

24. The spark plug boot of claim 17, further including a spark duration adjusting element communicating with the center element, the spark duration adjusting element comprising a resistor.

25. The spark plug boot of claim 17, further including an electromagnetic interference suppressing element communicating with the center element, the electromagnetic interference suppressing element selected from the group consisting of resistors and resistive inductors.

26. The spark plug boot of claim 17, wherein the center element and insulator are sized and configured to produce an optimum capacitance value, the optimum capacitance value determined by finding a maximum capacitance value and subtracting a safety margin;

wherein the maximum capacitance value is determined when the spark plug sparks sporadically and the safety margin is determined when the spark plug sparks consistently.

27. The spark plug boot of claim 26, wherein the optimum capacitance value can range from about 10 picofarads to about 200 picofarads.

28. A spark plug boot configured to individual coil-on-plug ignition systems, each ignition system comprising an electrical current source and a spark plug mounted in a cylinder head cavity, the spark plug boot comprising:

a center element structured to carry electric current from the electrical current source to the spark plug; and an insulator surrounding the center element, an outer surface of the insulator sized to engage a surface of the cylinder head cavity;

wherein the center element, the insulator and the cylinder head comprise a capacitor that has a capacitance which is optimized for each coil-on-plug ignition system.

29. The spark plug boot of claim 28, wherein the capacitance of the capacitor is optimized by finding a maximum capacitance value and subtracting a safety margin;

with the maximum capacitance value determined when the spark plug does not spark consistently; and the safety margin is determined when the spark plug sparks consistently.

30. The spark plug boot of claim 29, wherein the center element comprises a first capacitor member, and a capacitance of the capacitor is adjusted by selectively increasing and decreasing a surface area of the center element.

31. The spark plug boot of claim 29, wherein the center element comprises a first capacitor member, and a capacitance of the capacitor is adjusted by selectively increasing and decreasing a distance from the center element to a cylinder head surface.

32. The spark plug boot of claim 29, further including a outer member positioned about the spark plug boot, the outer member structured to deflectably engage the cylinder head.

33. The spark plug boot of claim 32, wherein the outer member is selected from a group consisting of:

a cylinder with an inner surface engaging the spark plug boot, and a deflectable rib attached to an outer surface of the cylinder, the deflectable rib structured to slidably engage the cylinder head;

a cylinder including two substantially half-cylinder sections, each section having two edges, with one section edge attached to the cylinder so that the half-cylinder sections are deflectably attached to the cylinder and can thereby deflectably engage the cylinder head; and a cylinder including two substantially half-cylinder members attached to the cylinder, the half-cylinder members having a maximum diameter near a middle of the cylinder, with the diameter decreasing toward each end of the cylinder, the half-cylinder members including a longitudinal slot so that the half-cylinder members can deflectably engage the cylinder head.

34. The spark plug boot of claim 29, further including a spark duration adjusting element communicating with the center element, the spark duration adjusting element comprising a resistor.

35. The spark plug boot of claim 29, further including an electromagnetic interference suppressing element communicating with the center element, the electromagnetic interference suppressing element selected from the group consisting of resistors and resistive inductors.

36. A method for optimizing a storage capacity of a capacitor included within a coil-on-plug ignition system, the method comprising the steps of:

providing a capacitor, the capacitor comprising a center element, an insulator surrounding the center element, the outer surface of the insulator sized to engage a cylinder head, with the center element, the insulator and the cylinder head comprising the capacitor;

determining an available electric current from the coil-on-plug ignition system communicating with the capacitor;

selecting an optimum capacitance value for the coil-on-plug ignition system by finding a maximum capacitance value and subtracting a safety margin; and adjusting a capacitance of the capacitor to approximate the optimum capacitance value.

37. The method of claim 36, wherein the maximum capacitance value is determined when the spark plug does not spark consistently and the safety margin is determined when the spark plug sparks consistently.

38. The method of claim 36, wherein the optimum capacitance value can range from about 10 picofarads to about 200 picofarads.

39. The method of claim 36, wherein the step of adjusting the capacitance of the capacitor is accomplished by selectively increasing and decreasing a distance between the center element and the cylinder head.

40. The method of claim 36, further including the step of suppressing electromagnetic interference by providing at least one of a resistor and a resistive inductor that communicate with the center element.

41. A spark plug boot for a coil-on-plug ignition system comprising an electrical current source and a spark plug mounted in a cylinder head cavity, the spark plug boot comprising:

a center element structured to carry electric current from the electrical current source to the spark plug; and an insulator surrounding the center element; and an outer member positioned about at least a portion of the insulator, the outer member sized to engage the cylinder head cavity, the outer member selected from the group consisting of:

a cylinder with an inner surface engaging the spark plug boot, and a deflectable rib attached to an outer surface of the cylinder, the deflectable rib structured to slidably engage the cylinder head;

a cylinder including two substantially half-cylinder sections, each section having two edges, with one section edge attached to the cylinder so that the half-cylinder sections are deflectably attached to the cylinder and can thereby deflectably engage the cylinder head; and a cylinder including two substantially half-cylinder members attached to the cylinder, the half-cylinder members having a maximum diameter near a middle of the cylinder, with the diameter decreasing toward each end of the cylinder, the half-cylinder members including a longitudinal slot so that the half-cylinder members can deflectably engage the cylinder head;

wherein the center element, the insulator and the outer member comprise a capacitor.

* * * * *